United States Patent
Ren et al.

(10) Patent No.: US 12,301,536 B2
(45) Date of Patent: May 13, 2025

(54) WI-FI ROAMING SUPPORT FOR CLOUD INTEGRATED REMOTE WLAN DEPLOYMENT

(71) Applicant: Hewlett Packard Enterprise Development LP, Spring, TX (US)

(72) Inventors: Zhijun Ren, Beijing (CN); Xiaoding Shang, Beijing (CN); Hao Lu, Fremont, CA (US); Qiwei Chang, Beijing (CN)

(73) Assignee: Hewlett Packard Enterprise Development LP, Spring, TX (US)

( * ) Notice: Subject to any disclaimer, the term of this patent is extended or adjusted under 35 U.S.C. 154(b) by 0 days.

(21) Appl. No.: 18/460,409

(22) Filed: Sep. 1, 2023

(65) Prior Publication Data

US 2025/0080493 A1 Mar. 6, 2025

(51) Int. Cl.
*H04L 61/5014* (2022.01)
*H04L 61/10* (2022.01)
*H04L 61/103* (2022.01)

(52) U.S. Cl.
CPC .......... *H04L 61/5014* (2022.05); *H04L 61/10* (2013.01); *H04L 61/103* (2013.01)

(58) Field of Classification Search
CPC .... H04L 61/5014; H04L 61/10; H04L 61/103
See application file for complete search history.

(56) References Cited

U.S. PATENT DOCUMENTS

| | | | |
|---|---|---|---|
| 7,471,656 B2 | 12/2008 | Karoubalis et al. | |
| 7,873,012 B2 * | 1/2011 | Sadot | H04L 61/50 370/332 |
| 8,161,543 B2 | 4/2012 | Nambiar | |
| 8,325,679 B2 | 12/2012 | Taaghol et al. | |
| 8,559,369 B2 | 10/2013 | Barkan | |
| 9,107,149 B2 | 8/2015 | Takeda et al. | |
| 9,204,473 B2 | 12/2015 | Wang et al. | |
| 9,276,768 B2 | 3/2016 | Berglund et al. | |
| 9,998,977 B2 | 6/2018 | Joshi et al. | |
| 2013/0103836 A1 * | 4/2013 | Baniqued | H04L 61/5014 709/226 |
| 2014/0119358 A1 * | 5/2014 | Xu | H04L 61/103 370/338 |

(Continued)

FOREIGN PATENT DOCUMENTS

WO 2022/103155 A1 5/2022

*Primary Examiner* — William G Trost, IV
*Assistant Examiner* — Adam A Cooney
(74) *Attorney, Agent, or Firm* — Yao Legal Services, Inc.

(57) ABSTRACT

An AP sets up a data tunnel to a remote network and monitors a remote DHCP session between a client device and a remote DHCP server in the remote network. The remote DHCP server assigns a remote IP address to the client device, and communication between the client device and the remote network is based on the remote IP address. In response to determining completion of the remote DHCP session, the AP initializes a local DHCP session with a local DHCP server in a local network to obtain a local IP address for the client device. Communication between the client device and the local network is based on the local IP address. In response to detecting the client device roaming from the AP to a target AP, the AP forwards the remote and local IP addresses and session data of active sessions on the client device to the target AP.

20 Claims, 5 Drawing Sheets

(56) References Cited

U.S. PATENT DOCUMENTS

| | | | |
|---|---|---|---|
| 2014/0254500 A1* | 9/2014 | Alavudin | H04W 72/044 |
| | | | 370/329 |
| 2014/0334438 A1* | 11/2014 | Cohen-Arazi | H04W 36/0077 |
| | | | 370/331 |
| 2017/0163597 A1* | 6/2017 | Amerneni | H04L 61/5014 |
| 2021/0344651 A1* | 11/2021 | Joshi | H04L 12/4641 |
| 2022/0417742 A1* | 12/2022 | Dey | H04W 12/069 |
| 2023/0066604 A1* | 3/2023 | Huang | H04L 9/40 |
| 2023/0412557 A1* | 12/2023 | Kim | H04L 61/255 |
| 2024/0121590 A1* | 4/2024 | Rajendiran | H04W 8/08 |

* cited by examiner

WI-FI ROAMING SUPPORT FOR CLOUD INTEGRATED REMOTE WLAN DEPLOYMENT

BACKGROUND

Field

This disclosure is generally related to Wi-Fi roaming in a remote wireless local area network (WLAN). More specifically, this disclosure is related to a system and method for improving the roaming performance in the remote WLAN.

BRIEF DESCRIPTION OF THE FIGURES

In the figures, like reference numerals refer to the same figure elements.

DETAILED DESCRIPTION

A large corporation with remote offices often deploys remote wireless local area networks (WLANs) to allow workers in their remote offices or at home to have a similar corporate Wi-Fi experience. In a remote WLAN, an access point (AP), referred to as a remote AP, can be connected to the corporate data center via a network tunnel. To improve the overall bandwidth efficiency, the remote AP may be configured to operate in a split-tunneling mode, which allows traffic from client devices or wireless stations directed to the cloud or the Internet to split from the tunnel at the AP's uplink. In other words, only the traffic to the corporate data center will be routed to the tunnel, whereas other traffic can be routed directly to the cloud or Internet. Compared with the traditional full-tunneling mode where all traffic is routed through the tunnel, the split-tunneling mode can be faster and more efficient. The split-tunneling mode has recently gained popularity as many applications (e.g., software as a service (SaaS) applications) and security components are shifting from traditional corporate data centers to cloud-based services.

With split tunneling, each remote AP should provide two data paths, one path being the tunnel to the corporate data center and the other path being the AP's uplink coupled to the local network. Source network address translation (SNAT) can be used to split the client traffic destined for the Internet from the tunnel by translating the IP address of the client device to the IP address of the AP's uplink. However, SNAT may cause problems during Wi-Fi roaming. When a client device roams from one AP (referred to as the home AP) to another AP (referred to as the target AP), existing data sessions may be interrupted as the source address of the traffic is now changed from the uplink of the home AP to the uplink of the target AP, thus leading to poor user experience, especially for applications requiring high roaming performance (e.g., Voice over Internet Protocol (VoIP) or video conference applications, gaming applications, etc.). Moreover, different client devices connected to different remote APs within the same branch office may not be able to communicate directly with each other and may need to send their traffic to the corporate data center via corresponding tunnels.

Figure 1:
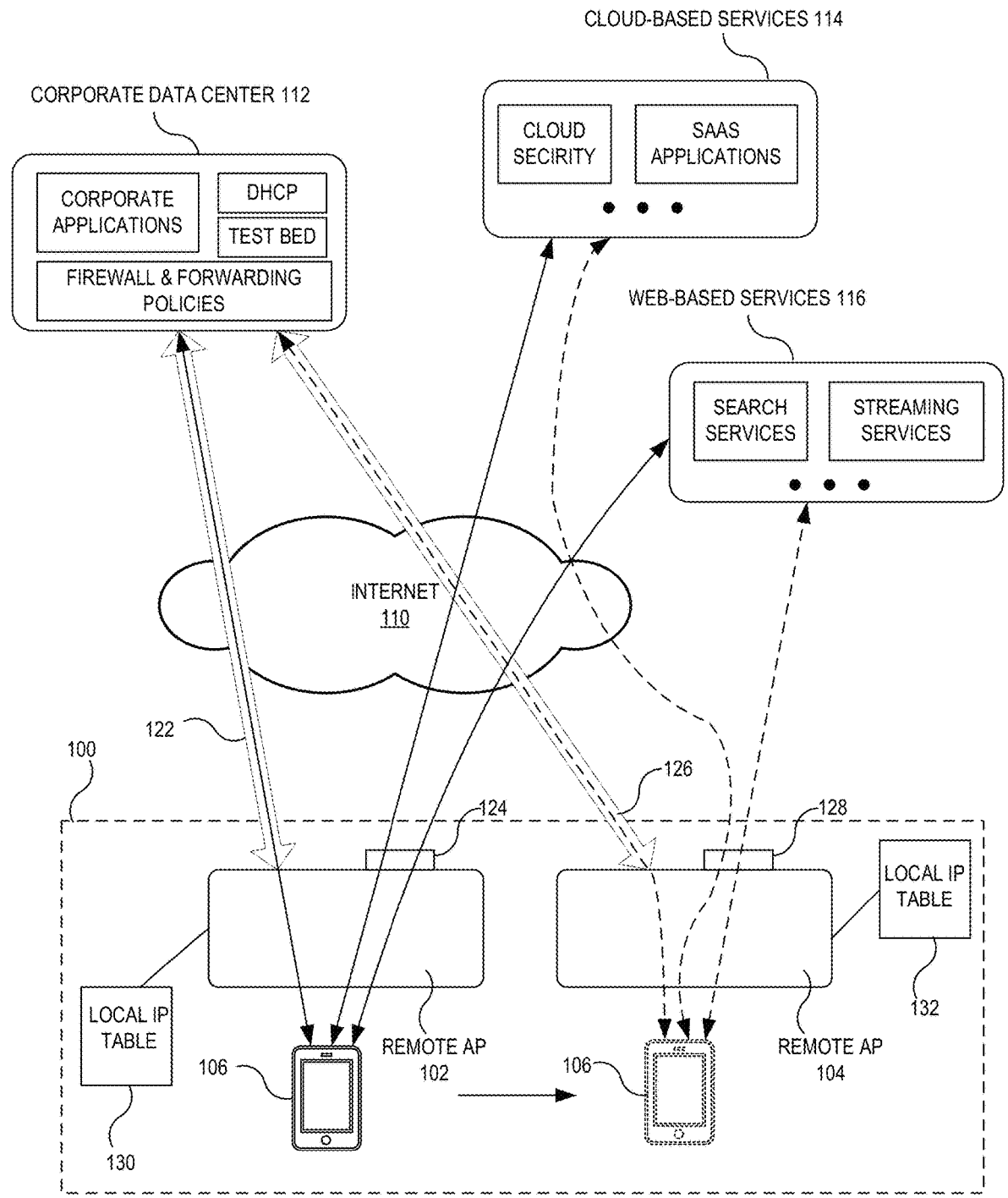
FIG. 1 illustrates an example of a split-tunneling scenario, according to one aspect of the instant application.

FIG. 1 illustrates an example of a split-tunneling scenario, according to one aspect of the instant application. In FIG. 1, a branch office 100 of a corporation can include a number of remote APs, such as remote APs 102 and 104. These APs are referred to as remote APs because they are remote with respect to corporate data center 112, which can host various cooperate applications, provide the corporate Dynamic Host Configuration Protocol (DHCP) services, implement a software test bed, and enforce firewall and forwarding policies. Wireless client devices (or stations) within branch office 100 can access the network (which can include Internet 110 and the internal corporate network) by coupling to one of the remote APs. For example, at a particular time, a client device 106 can be coupled to remote AP 102 and may roam to remote AP 104 at a different time.

In addition to the corporate services provided by servers in corporate data center 112, the client devices (e.g., device 106) can also access cloud-based services 114 (which can include cloud security services, SAAS applications, etc.) and web-based services 116 (which can include search services, streaming services, etc.) via the remote APs. In the example shown in FIG. 1, each remote AP is configured in the split-tunneling mode such that traffic to corporate data center 112 will go through a layer-2 (L2) data tunnel, whereas traffic to cloud-based services 114 and web-based services 116 can be sent to their destinations through Internet 110. When the split-tunneling mode is enabled, each remote AP can provide two uplink interfaces: a tunnel interface and a SNAT-enabled interface. For example, remote AP 102 can provide a tunnel interface 122 and an SNAT-enabled interface 124; remote AP 104 can provide a tunnel interface 126 and an SNAT-enabled interface 128.

When client device 106 is coupled to remote AP 102, client traffic to corporate applications can be forwarded to corporate data center 112 over tunnel interface 122. Appropriate firewall and forwarding policies can be applied to the client traffic before they gain access to the corporate applications. As discussed previously, the deployment of the remote APs in branch office 100 is designed to provide users in branch office 100 with a similar Wi-Fi experience as users in the central office, meaning that the Wi-Fi network in branch office 100 is an L2 extension of the corporate network. Note that corporate data center 112 can provide DHCP services for the corporate network. When client device 106 is connected to the corporate network, it can obtain an IP address from the DHCP server in corporate data center 112. Such an IP address can be referred to as a remote IP address. From the perspective of a corporate application, a data session with client device 106 is set up between the remote IP address of client device 106 and the service IP of the corporate application.

On the other hand, client traffic to cloud-based services 114 and web-based services 116 can break out from tunnel interface 122 and can be forwarded to Internet 110 via the SNAT-enabled interface 124 of remote AP 102. Because client device 106 obtains the remote IP address from the DHCP server in corporate data center 112, this remote IP address is agnostic to devices (e.g., switches and routers) in the local network. As a result, traffic to cloud-based services 114 and/or web-based service 116 should have its source address translated using the IP address of SNAT-enabled interface 124. From the perspective of a SAAS or a web-based application, a data session with client device 106 is set up between the IP address of interface 124 and the service IP of the SAAS or web-based application.

Configuring the remote APs to operate in the split-tunneling mode can shorten the forwarding path of certain client traffic (e.g., traffic to cloud-based services 114 and/or web-based services 116 no longer needs to go through corporate data center 112) and improve the overall bandwidth efficiency. However, in the split-tunneling scenario, the source address of the client traffic to cloud-based services 114 and/or web-based services 116 has been translated into the AP's uplink IP address, which may cause problems during roaming. When a client device roams from a home AP to a target AP, the source address of the client traffic should be updated from the uplink IP address of the home AP to that of the target AP. This address update can cause interruptions to existing data sessions on the client device, as the reverse traffic may attempt to reach the home AP. Reconnection between the client device and the target AP may be required to resume those data sessions. For applications requiring high roaming performance (e.g., VoIP applications, video-conference applications, gaming applications, etc.), such interruptions can lead to a bad user experience. For example, when client device 106 roams from AP 102 to AP 104, the source address of traffic to a video-conference application should be updated from the IP address of uplink interface 124 of AP 102 to the IP address of uplink interface 128 of AP 104. This may cause interruptions to the active video-conference data session, and the user may be dropped from the video conference.

In addition to the service interruptions during roaming, the split-tunneling mode of the APs can also increase the latency for traffic between client devices within the same branch office. Because the remote IP addresses of the client devices are agnostic to the local network, communications among the client devices in the branch office 100 need to go through corporate data center 112. This can add unnecessary delays to the local traffic.

To solve the above two problems, according to some aspects of the instant application, each AP can maintain a local IP address for each coupled client device. For example, AP 102 can maintain a local IP table 130 that stores the local IP address of the coupled client devices (e.g., client device 106). Similarly, AP 104 can maintain a local IP table 132. Client devices can use their local IP addresses to access cloud-based services 114 and/or web-based services 116, meaning that client traffic to cloud-based services 114 and/or web-based services 116 would be source translated using the corresponding local IP address. In the example shown in FIG. 1, when client device 106 roams from home AP 102 to target AP 104, home AP 102 can search local IP table 130 to obtain the local IP address of client device 106 and forward this local IP address to target AP 104, thus allowing target AP to continue the existing data sessions on client device 106 using this local IP address. Client devices within branch office 100 can also communicate with each other using their local IP addresses.

Different mechanisms can be used to obtain local IP addresses for the client devices. According to some aspects, when a client device initially joins the Wi-Fi network (e.g., by coupling to an AP) at the branch office, the coupled AP can obtain, on behalf of the client device, a local IP address from a DHCP server in the local network. Note that the local network is with respect to the APs and can be a physical local area network (LAN) or a virtual LAN (VLAN).

According to one aspect, this local IP address can be obtained after the client device has been assigned a corporate IP address by the DHCP server in the corporate data center. This corporate IP address can also be referred to as a remote IP address. More specifically, the AP can snoop on the DHCP messages exchanged between the client device and the DHCP server in the corporate data center. In response to determining that the DHCP handshake with the corporate data center is completed (e.g., by detecting the acknowledgment message from the DHCP server), the AP can trigger a DHCP discovery process in the local network on behalf of the client device. For example, the AP can broadcast, over its uplink interface, a DHCP discovery message to the local network. This DHCP discovery message should be responded to by a DHCP server in the local network (e.g., within the branch office) or in the Internet Service Provider (ISP) network. The DHCP server can then assign another IP address (which is different from the remote IP address assigned by the DHCP service in the corporate data center and can be referred to as a local IP address) to the client device. This DHCP process can be transparent to the client device, and the client device is not aware of the existence of the local IP address.

Figure 2:
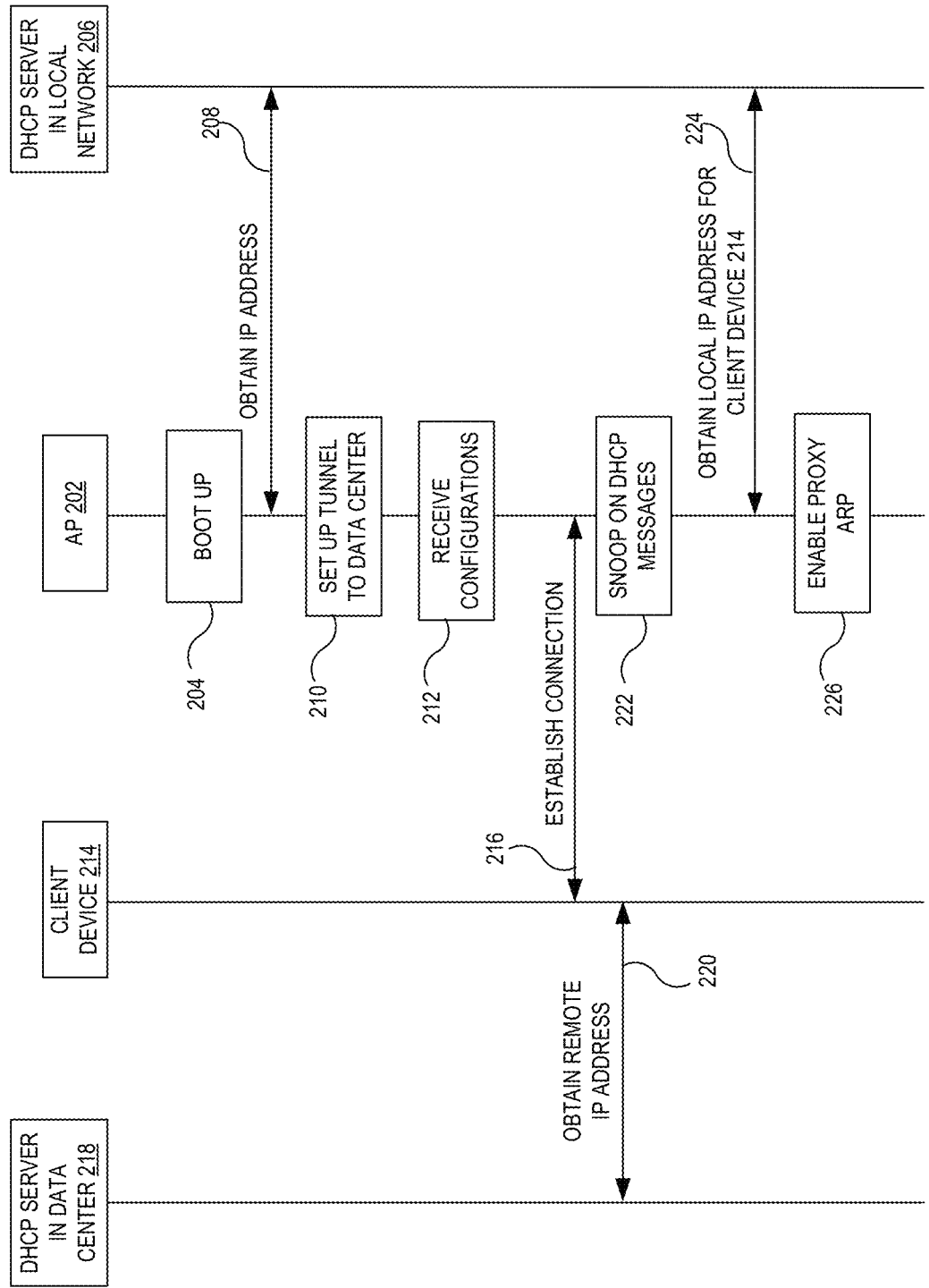
FIG. 2 illustrates an example of a sequence of operations for configuring the IP addresses of a client device, according to one aspect of the instant application.

FIG. 2 illustrates an example of a sequence of operations for configuring the IP addresses of a client device, according to one aspect of the instant application. During operation, an AP 202 in a branch office of a corporation can boot up and be connected to the network (operation 204). AP 202 can communicate with a DHCP server 206 in the local network or the ISP network to obtain an IP address (operation 208). According to some aspects, AP 202 can communicate with DHCP server 206 via an uplink interface, and the IP address assigned by DHCP server 206 can be associated with that particular uplink interface. In this example, AP 202 is configured as a remote AP for the corporate network and can subsequently set up a data tunnel to the corporate data center (operation 210). After setting up the tunnel, AP 202 can receive configurations from a network management entity and activate the wireless network (operation 212). In some examples, AP 202 can be configured by an administrator via a command-line interface (CLI) or a local user interface. Alternatively, AP 202 can receive configuration files from a cloud-based network management system.

A client device 214 can establish a connection to AP 202 to access the wireless network (operation 216). For example, when the radio of client device 214 is turned on, client device 214 can scan for available wireless networks and can be authenticated by and associated with AP 202. Because AP 202 is configured as a remote AP for the corporate network, the wireless network provided by AP 202 can be the L2 extension of the corporate network, meaning that client device 214 can join the corporate network via the data tunnel. Once client device 214 is connected to the corporate network, it can obtain an IP address from a DHCP server 218 in the corporate data center (operation 220). For example, client device 214 can send, via the data tunnel, a DHCP discovery message to DHCP server 218, which can then assign a dynamic IP address to client device 214. Such an IP address is in the context of the corporate network and can be referred to as a corporate or remote IP address of client device 214. Communications between client device 214 and the remote corporate network can be based on this remote IP address. Depending on the implementation, the remote IP address of client device 214 can be an Internet Protocol version 4 (IPv4) address or an Internet Protocol version 6 (IPv6) address.

While client device 214 is sending the DHCP discovery and request messages to and receiving the DHCP offer and acknowledgment messages from DHCP server 218, AP 202 is snooping on these DHCP messages (operation 222). Upon determining that the DHCP process with DHCP server 218 in the corporate data center is completed, AP 202 can trigger, on behalf of client device 214, a DHCP process with DHCP server 206 in the local or ISP network to obtain a second IP address for client device 214 (operation 224). More specifically, AP 202 can send a DHCP discovery packet that includes the media access control (MAC) address of client device 214 to DHCP server 206, which can respond with an IP address assigned to client device 214. Because this IP address is in the context of the local network, it can be referred to as a local IP address. Although the local IP address is assigned to client device 214, client device 214 may not be aware of its existence, as AP 202 sends and receives all DHCP messages on behalf of client device 214. According to one aspect, this local IP address is agnostic to client device 214 and is only maintained by AP 202. According to a further aspect, AP 202 can maintain a local IP table, with each entry in the local IP table indicating a mapping between the MAC address and the local IP address of a client device coupled to AP 202. Depending on the implementation, the local IP address can be an IPv4 address or an IPv6 address.

In addition to obtaining the local IP address on behalf of client device 214, AP 202 can also enable a proxy Address Resolution Protocol (ARP) function for the local IP address (operation 226). Enabling the proxy ARP allows AP 202 to answer queries for the local IP address of client device 214, thus making client device 214 visible in the local network. Based on the ARP queries, uplink switches can forward traffic destined for client device 214 to AP 202, which can then send the traffic to client device 214.

In the example shown in FIG. 2, AP 202 obtains the local IP address for client device 214 without the awareness of client device 214. Therefore, AP 202 is also responsible for the renewal and release of this local IP address. For example, if client device 214 is disconnected from the wireless network, AP 202 should release the local IP address on behalf of client device 214. When roaming happens, besides synchronizing the local IP address of the client device to the target AP, the DHCP lease time should also be synchronized to provide the target AP with sufficient information for renewing the DHCP lease. After roaming, the responsibility of maintaining the local IP address for client device 214 is shifted from the home AP to the target AP.

The remote AP (e.g., AP 202) can be configured in the split-tunneling mode such that traffic from client device 214 to the local network or services reachable by the local network (e.g., SAAS applications or public websites) can be split from the data tunnel at AP 202. More specifically, traffic from client device 214 to the corporate data center can be forwarded to the data center over the data tunnel, where the packets would be encapsulated according to the tunneling protocol. On the other hand, traffic from client device 214 to the local network can be source translated using the local IP address of client device 214, which is maintained by AP 202 in a local IP table. In one example, AP 202 can enforce a 1:1 SNAT to translate the source address of the client traffic using the local IP address of each coupled client device. After the source translation, communications between client device 214 and the local network can be based on the local IP address of client device 214.

In the event of Wi-Fi roaming where client device 214 travels out of the coverage range of AP 202 to the coverage range of a target IP (not shown in FIG. 2), the target AP may broadcast an L2 session-request message in the local network to request for the user and session information associated with client device 214. In response to receiving this broadcast message, AP 202 can unicast a session-response message carrying the local IP address of client device 214 along with its MAC address and remote (or corporate) IP address to the target AP. The session-response message can also include additional information such as the user-role information (which can be used to enforce the access-control policy) and the session table entries. The address information as well as the session information can facilitate the target AP in continuing the sessions for client device 214.

After client device 214 roams to the target AP, AP 202 can disable the proxy ARP function for client device 214, meaning that it no longer answers the ARP queries for client device 214. Instead, the target AP can start to answer the ARP queries on behalf of client device 214. In addition, the target AP can issue a gratuitous ARP packet for client device 214 using its corporate or remote IP address in the corporate network. This can cause reverse packets from the corporate data center to client device 214 to be switched to the data tunnel between the corporate data center and the target AP. Moreover, the target AP can issue an additional gratuitous APR packet for client device 214 using its local IP address in the local network, thus causing reverse packets from the local network (e.g., from other client devices or cloud/web-based services) to be forwarded to the target AP.

Moreover, because each AP can answer the ARP queries for coupled client devices using the client devices' local IP addresses, client devices within the same branch office (which may be coupled to the same or different APs) can communicate with each other using their local IP addresses.

Figure 3:
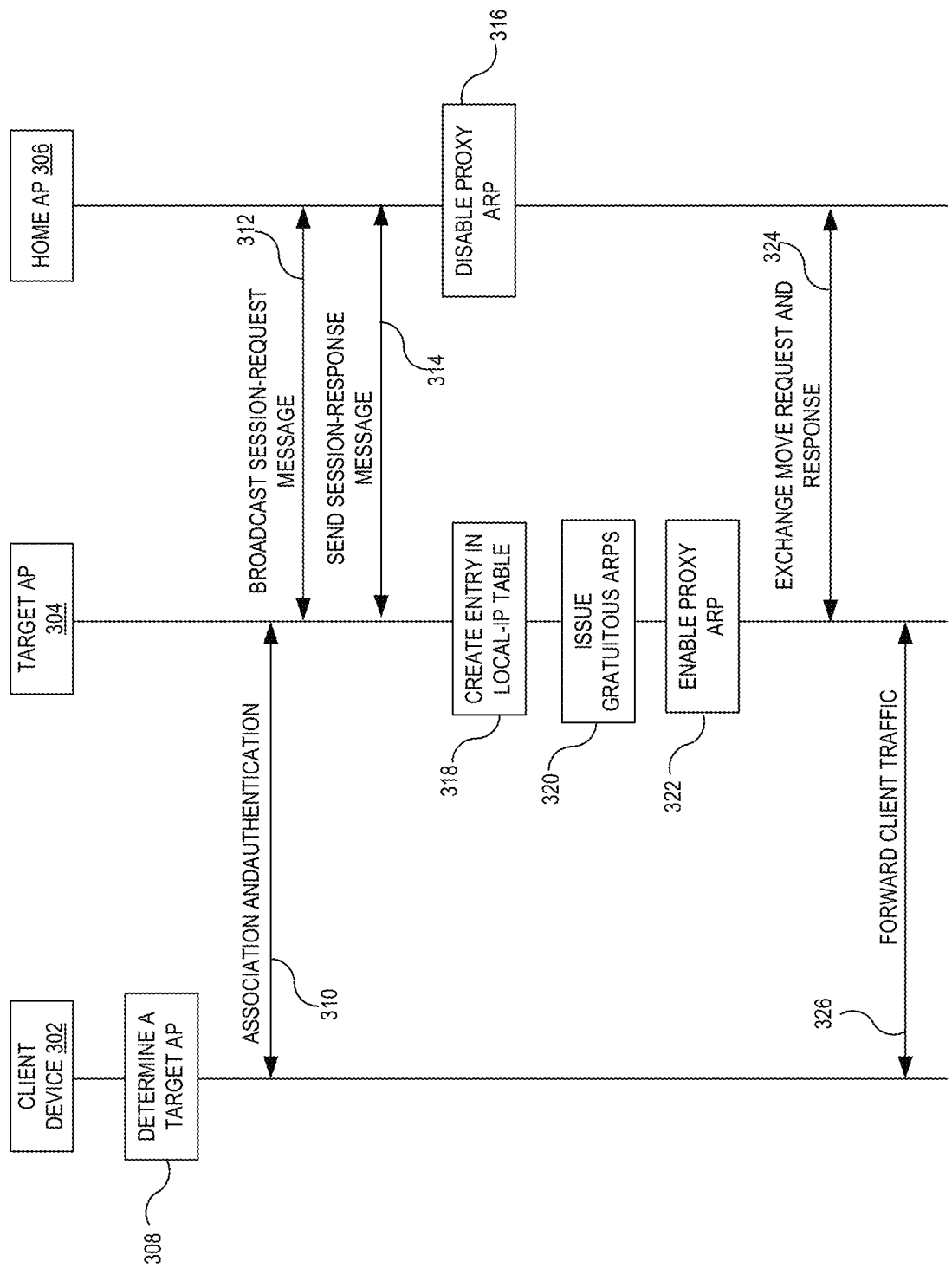
FIG. 3 illustrates an example of a roaming process, according to one aspect of the instant application.

FIG. 3 illustrates an example of a roaming process, according to one aspect of the instant application. During operation, a client device 302 determines a target AP 304 based on the received signal strength indicator (RSSI) as it is moving out of the coverage range of a home AP 306 (operation 308). Client device 302 can initiate association and authentication with target AP 304 (operation 310).

In response to the association request, target AP 304 can broadcast an L2 session-request message to all APs in the local network (operation 312). In response to receiving the L2 session-request message, home AP 306 can send an L2 unicast session-response message to target AP 304 (operation 314). The session-response message can synchronize the user and session information associated with client device 302 from home AP 306 to target AP 304. In one example, the session-response message can include the address information (e.g., the MAC address, the remote IP address, and the local IP address) associated with client device 302. The remote IP address of client device 302 can be assigned by a DHCP server in the remote corporate data center, and the local IP address of client device 302 can be assigned by a DHCP server in the local network or the ISP network. Note that, because home AP 306 maintains the local IP address on behalf of client device 302, home AP 306 should also include the DHCP information (e.g., the DHCP lease time) associated with the local IP address in the session-response message. The DHCP information for the remote IP address is not needed because client device 302 is managing the remote IP address.

The session-response message can also include user information (e.g., the user's role information used to enforce access-control policies) and datapath session data for sessions that are currently active on client device 302. The session data can then be stored in the session table maintained by target AP 304. The synchronization of the session data allows target AP 304 to continue forwarding client traffic associated with the active sessions on client device 302. In addition to transmitting the session-response message to the target AP, home AP 306 can also disable its proxy ARP function for client device 302 (operation 316).

Upon receiving the session-response message, target AP 304 can create a new entry in its local IP table to store the mapping between the MAC address and the local IP address of client device 302 (operation 318). In addition, target AP 304 can issue two gratuitous ARP packets (operation 320). One gratuitous ARP packet carrying the remote IP address of client device 302 is issued to the data tunnel between target AP 304 and the corporate data center, and the other gratuitous ARP packet carrying the local IP address of client device 302 is issued to the local network. The gratuitous ARP issued to the tunnel allows reverse packets from the corporate data center to be immediately switched from the tunnel between home AP 306 and the data center to the tunnel between target AP 304 and the data center. The gratuitous ARP issued to the local network allows reverse packets from the local network to be immediately forwarded by upstream switches to target AP 304.

Target AP 304 can also enable the proxy ARP function for the local IP address of client device 302 in the local network (operation 322). ARP queries carrying the local IP address of the client device 302 would be answered by target AP 304. In one example, target AP 304 can look up its local IP table to identify the MAC address corresponding to a received ARP query.

Target AP 304 can subsequently exchange move-request and move-response messages with home AP 306 to complete the roaming process (operation 324). For example, target AP 304 can send a move-request message to home AP 306 and receive a move-response message from home AP 306. Target AP 304 can further send a report message to the network management service to report the success of the roaming event. After roaming is completed, target AP 304 can start forwarding traffic to and from client device 302 based on session data in its session table (operation 326). More specifically, client traffic to the local network continues to be source translated using the same local IP address of client device 302, and the active sessions will not be interrupted.

Figure 4:
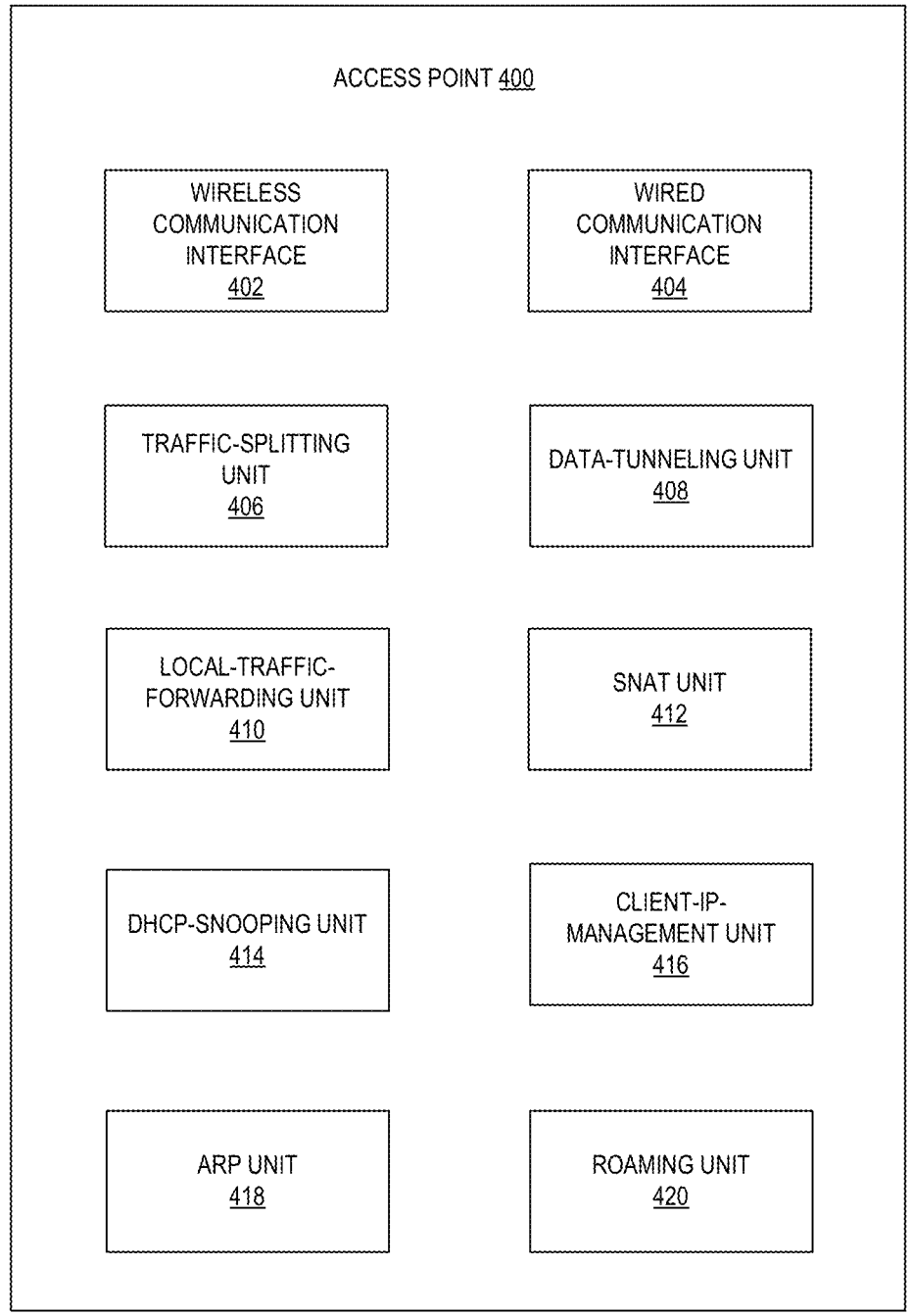
FIG. 4 illustrates an example of the block diagram of a wireless access point, according to one aspect of the instant application.

FIG. 4 illustrates an example of the block diagram of a wireless access point, according to one aspect of the instant application. AP 400 can include a wireless communication interface 402, a wired communication interface 404, a traffic-splitting unit 406, a data-tunneling unit 408, a local-traffic-forwarding unit 410, a SNAT unit 412, a DHCP-snooping unit 414, a client-IP-management unit 416, an ARP unit 418, and a roaming unit 420.

AP 400 provides network connection services to mobile devices via wireless communication interface 402. AP 400 can receive requests (e.g., probe requests, authentication requests, association requests, etc.) from mobile devices and send responses (e.g., probe responses, authentication responses, association responses, etc.) to mobile devices via wireless communication interface 402. Once a mobile device is authenticated and associated, AP 400 can start forwarding packets on behalf of the mobile device.

AP 400 can communicate with other APs in the local network and the network-management service via wired communication interface 404. For example, AP 400 can broadcast L2 session-request messages to and receive L2 session-response messages from other APs via wired communication interface 404. AP 400 can also exchange move-request and move-response messages with another AP via wired communication interface 404. AP 400 can also send report messages to the network-management service (which can reside on a remote network-management server or in the cloud) via wired communication interface 404.

Traffic-splitting unit 406 can be responsible for separating the client traffic to the local network from the client traffic to the corporate data center. For example, client traffic to cloud-based services (e.g., SAAS applications) and/or public websites can be separated from the client traffic to the corporate application hosted by servers in the corporate data center. The separation of the client traffic can be based on the destination address of the client traffic. Data-tunneling unit 406 can be responsible for establishing and maintaining a data tunnel to a remote corporate data center. Data-tunneling unit 406 can include software-or hardware-based components used for encapsulating the packets. Client traffic destined for the corporate data center can be encapsulated and sent over the data tunnel. Data-tunneling unit 406 can allow AP 400 to function as a remote AP in the corporate network such that the wireless network provided by AP 400 can be the L2 extension of the corporate network. Users of client devices coupled to AP 400 can have a similar network experience as users of client devices directly coupled to the corporate network.

Local-traffic-forwarding unit 410 can be responsible for forwarding client traffic destined for the local network of AP 400. For example, local-traffic-forwarding unit 410 can forward client traffic destined for cloud-based services (e.g., SAAS applications) and/or public websites to switches/routers in the local network. Note that because the corporate or remote IP addresses of the client devices are agnostic in the local network, the source addresses of the client traffic should be translated to addresses known in the network. SNAT unit 412 can be responsible for translating the source address of the client traffic. According to some aspects, SNAT unit 412 can apply a 1:1 SNAT using the local IP address of each client device.

DHCP-snooping unit 414 can be responsible for snooping the DHCP handshake between the client device and the DHCP server in the corporate data center. When the client device first joins the corporate network (e.g., by connecting to AP 400), it can exchange messages with the DHCP server in the corporate data center to obtain a corporate or remote IP address. DHCP-snooping unit 414 can snoop on those messages to determine whether the DHCP process is completed. Client-IP-management unit 416 can be responsible for obtaining and managing a local IP address for the client device. More specifically, when DHCP-snooping unit 414 determines that the DHCP process in the corporate network is completed, client-IP-management unit 416 can initiate a DHCP process with a DHCP server residing in the local or ISP network on behalf of the client device. Client-IP-management unit 416 can obtain a local IP address for the client device and store the local IP address in a local IP table. Client-IP-management unit 416 can also be responsible for managing the DHCP lease time and the release of the local IP address.

ARP unit 418 can be responsible for answering the ARP queries arriving at AP 400. According to some aspects, APR unit 418 can enable proxy ARP for the local IP addresses stored in the local IP table, thus making the client devices visible in the local network. ARP unit 418 can also be responsible for issuing gratuitous ARP packets on behalf of a client device after the client device roams from its home AP to a target AP. According to one aspect, ARP unit 418 can issue a gratuitous APR to the corporate network using the corporate/remote IP address of the client device to allow reverse traffic from the corporate network to switch to the data tunnel to the target AP. ARP unit 418 can also issue a gratuitous APR to the local network using the local IP address of the client device to allow reverse traffic from the local network to be forwarded to the target AP.

Roaming unit 420 can be responsible for handling the various message exchanges during roaming. For example, if AP 400 is the target AP, roaming unit 420 can broadcast a session-request message to other APs in the local network and receive a session-response message from the home AP. On the other hand, if AP 400 is the home AP, roaming unit 420 can receive a session-request broadcast message from and send a session-response unicast message to the target AP. The session-response message can include the user and session information associated with the roaming client device. According to one aspect, the user information can include the user's role; the session information can include the MAC address, the remote AP address, and the local AP address associated with the client device. In addition, DHCP information (e.g., the DHCP lease time) associated with the local AP address can also be included in the session-response message.

Figure 5:
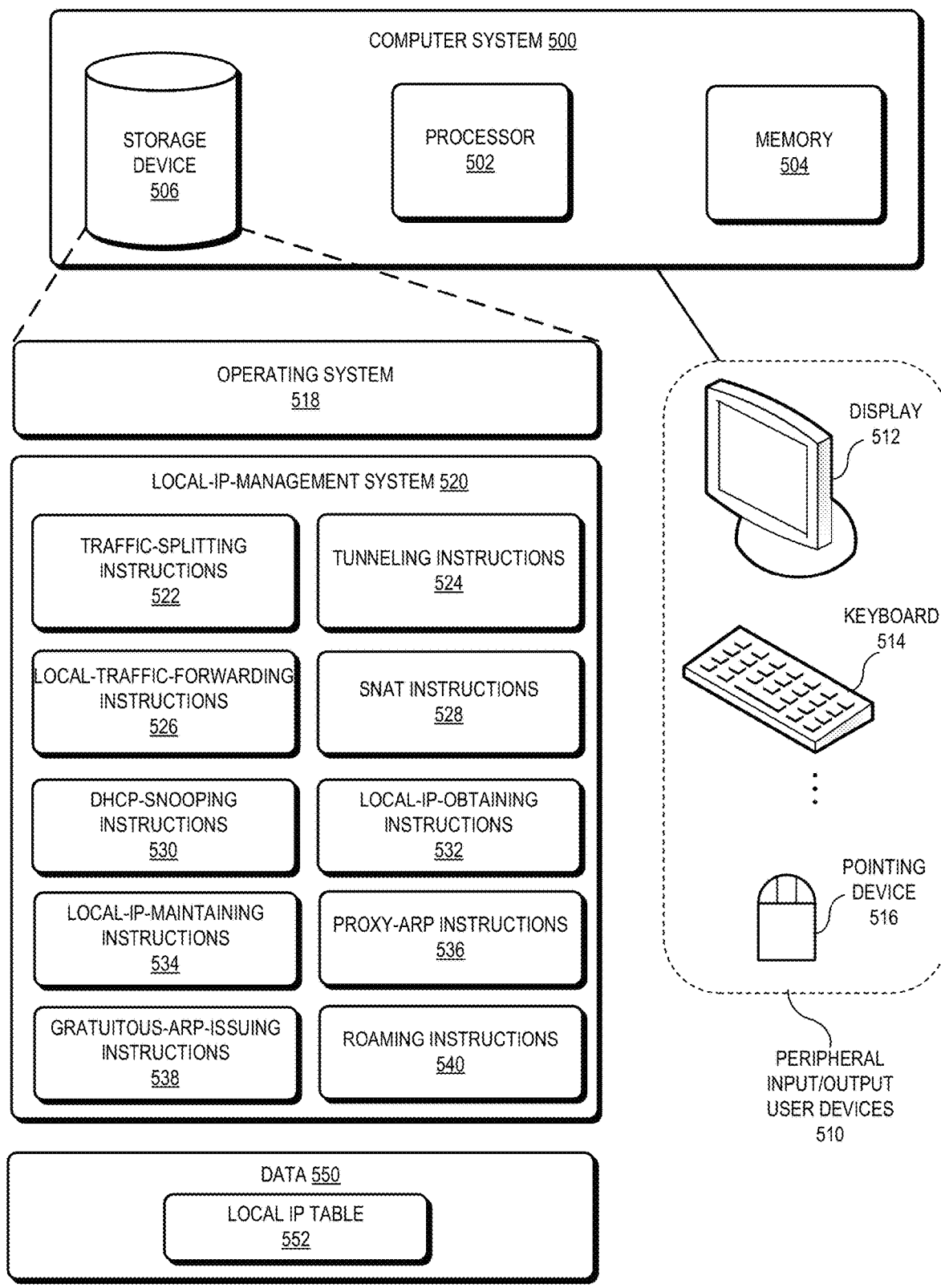
FIG. 5 illustrates an example of a computer system that facilitates the management of client local IP addresses, according to one aspect of the instant application.

FIG. 5 illustrates an example of a computer system that facilitates the management of client local IP addresses, according to one aspect of the instant application. Computer system 500 can include a processor 502, a memory 504, and a storage device 506. Furthermore, computer system 500 can be coupled to peripheral input/output (I/O) user devices 510, e.g., a display device 512, a keyboard 514, and a pointing device 516. Storage device 506 can store an operating system 518, a local-IP-management system 520, and data 550. According to some aspects, computer system 500 can be embodied as various functional blocks included in an AP that functions as a remote AP to extend the corporate network to a remote branch office or to the home of an employee.

Local-IP-management system 520 can include instructions, which when executed by computer system 500, can cause computer system 500 or processor 502 to perform methods and/or processes described in this disclosure. Specifically, by executing these instructions, computer system 500 can achieve the goal of reducing the roaming latency for cloud-or web-based applications executing on client devices coupled to remote APs. Local-IP-management system 520 can include instructions for splitting the client traffic to the local network from the client traffic to the data center (traffic-splitting instructions 522), instructions for establishing and maintaining a data tunnel to the corporate data center (tunneling instructions 524), instructions for forwarding client traffic to the local network (local-traffic-forwarding instructions 526), instructions for source translating the client traffic to the local network (SNAT instructions 528), instructions for snooping DHCP messages between a client device and a DHCP server in the corporate data center (DHCP-snooping instructions 530), instructions for obtaining the local IP address from a local DHCP server on behalf of the client device (local-IP-obtaining instructions 532), instructions for maintaining the local IP address for the client device (local-IP-maintaining instructions 534), instructions for proxying ARP for the local IP address (proxy ARP instructions 536), instruction for issuing gratuitous ARP packets on behalf of the client device during roaming (gratuitous-ARP-issuing instructions 538), and instructions for facilitating the roaming of the client device (roaming instructions 540). Data 550 can include a local IP table 552.

In general, the disclosure describes a mechanism to improve the roaming performance of client devices coupled to remote APs configured in a split-tunneling mode. Each AP can be configured to maintain a local IP address for each coupled client device. More specifically, once the AP detects the completion of a DHCP session between the client device and a remote DHCP server (which assigns a remote IP address to the client device over a data tunnel), the AP can start a DHCP discovery process in the local network of the AP on behalf of the client device to obtain a local IP address for the client device. The local IP address is agnostic to the client device and is maintained by the AP. The AP can store the local IP addresses of coupled client devices in a local IP table and manage the DHCP lease time and release of the local IP addresses. When a client device roams from its home AP to a target AP, the home AP can forward the remote and local IP addresses of the client device along with its MAC address and session data to the target AP to allow the target AP to continue active sessions on the client device, thus improving the roaming performance.

One aspect of the instant application can provide a system and method for improving the Wi-Fi roaming performance. During operation, an access point (AP) can set up a data tunnel to a remote network and monitor a remote Dynamic Host Configuration Protocol (DHCP) session between a client device coupled to the AP and a remote DHCP server in the remote network. The remote DHCP server can assign a remote Internet protocol (IP) address to the client device, and communications between the client device and the remote network can be based on the remote IP address. In response to determining completion of the remote DHCP session, the AP can initialize a local DHCP session with a local DHCP server in a local network on behalf of the client device to obtain a local IP address for the client device. Communications between the client device and the local network can be based on the local IP address. In response to detecting the client device roaming from the AP to a target AP, the AP can forward the remote and local IP addresses of the client device and session data associated with active sessions on the client device to the target AP.

In a variation on this aspect, the AP can perform source address translation using the local IP address of the client device for the communication between the client device and the local network.

In a variation on this aspect, monitoring the remote DHCP session can include snooping on DHCP messages exchanged between the remote DHCP server and the client device over the data tunnel.

In a variation on this aspect, the AP can forward DHCP lease information associated with the local IP address of the client device to the target AP.

In a variation on this aspect, subsequent to obtaining the local IP address for the client device, the AP can enable a proxy Address Resolution Protocol (ARP) function for the local IP address of the client device.

In a further variation, subsequent to forwarding the remote and local IP addresses of the client device to the target AP, the AP can disable the proxy ARP function for the local IP address of the client device.

In a variation on this aspect, subsequent to receiving the remote and local IP addresses of the client device, the target AP is to issue a first gratuitous ARP packet carrying the remote IP address to the data tunnel and issue a second gratuitous APR packet carrying the local IP address to the local network.

In a further variation, the target AP is to enable a proxy Address Resolution Protocol (ARP) function for the local IP address of the client device and continue the active sessions on the client device.

In a variation on this aspect, the AP can store a mapping between the local IP address and a media access control (MAC) address of the client device in a local IP table.

In a variation on this aspect, the AP can be configured to operate in a split-tunneling mode such that traffic from the client device to the remote network is forwarded to the data tunnel and traffic from the client device to the local network is forwarded to a local uplink of the AP.

The above description is presented to enable any person skilled in the art to make and use the examples and is provided in the context of a particular application and its requirements. Various modifications to the disclosed examples will be readily apparent to those skilled in the art, and the general principles defined herein may be applied to other implementations and applications without departing from the spirit and scope of the present disclosure. Thus, the scope of the present disclosure is not limited to the examples shown but is to be accorded the widest scope consistent with the principles and features disclosed herein.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium. The computer-readable storage medium may be, for example, Random Access Memory (RAM), non-volatile RAM (NVRAM), an Electrically Erasable Programmable Read-Only Memory (EEPROM), a storage device, an optical disc, and the like. The computer-readable storage medium may be a non-transitory storage medium, where the term "non-transitory" does not encompass transitory propagating signals.

Furthermore, the methods and processes described above can be included in hardware devices or apparatus. The hardware devices or apparatus can include, but are not limited to, application-specific integrated circuit (ASIC) chips, field-programmable gate arrays (FPGAs), dedicated or shared processors that execute a particular software unit or a piece of code at a particular time, and other programmable-logic devices now known or later developed. When the hardware devices or apparatus are activated, they perform the methods and processes included within them.

The foregoing descriptions of examples have been presented for purposes of illustration and description only. They are not intended to be exhaustive or to limit the scope of this disclosure to the forms disclosed. Accordingly, many modifications and variations will be apparent to practitioners skilled in the art.

What is claimed is:

1. A method comprising:
   setting up, by an access point (AP), a data tunnel to a remote network;
   monitoring, by the AP, a remote Dynamic Host Configuration Protocol (DHCP) session between a client device coupled to the AP and a remote DHCP server in the remote network, wherein the remote DHCP server assigns a remote Internet protocol (IP) address to the client device, and wherein communications between the client device and the remote network are based on the remote IP address;
   in response to determining completion of the remote DHCP session, initializing, by the AP, a local DHCP session with a local DHCP server in a local network on behalf of the client device to obtain a local IP address for the client device, wherein communications between the client device and the local network are based on the local IP address; and
   in response to detecting the client device roaming from the AP to a target AP, forwarding, by the AP, the remote and local IP addresses of the client device and session data associated with active sessions on the client device to the target AP.

2. The method of claim 1, further comprising performing source address translation using the local IP address of the client device for the communications between the client device and the local network.

3. The method of claim 1, wherein the monitoring of the remote DHCP session comprises snooping on DHCP messages exchanged between the remote DHCP server and the client device over the data tunnel.

4. The method of claim 1, further comprising forwarding, by the AP, DHCP lease information associated with the local IP address of the client device to the target AP.

5. The method of claim 1, wherein the AP obtains the local IP address on behalf of the client device from the local DHCP server in the local DHCP session.

6. The method of claim 1, further comprising:
   subsequent to obtaining the local IP address for the client device, enabling, by the AP, a proxy Address Resolution Protocol (ARP) function for the local IP address of the client device; and
   subsequent to forwarding the remote and local IP addresses of the client device to the target AP, disabling the proxy ARP function for the local IP address of the client device.

7. The method of claim 1, wherein, subsequent to receiving the remote and local IP addresses of the client device, the target AP:
   issues a first gratuitous Address Resolution Protocol (ARP) packet carrying the remote IP address to the data tunnel; and
   issues a second gratuitous ARP packet carrying the local IP address to the local network.

8. The method of claim 7, wherein subsequent to the roaming the target AP:
   enables a proxy ARP function for the local IP address of the client device; and
   continues the active sessions on the client device.

9. The method of claim 3, further comprising:
   determining, based on detecting an acknowledgment message in the snooping, that a DHCP handshake between the client device and the remote network is complete,
   wherein the initializing, by the AP, of the local DHCP session is based on determining that the DHCP handshake is complete.

10. The method of claim 1, further comprising:
    configuring the AP to operate in a split-tunneling mode such that traffic from the client device to the remote network is forwarded to the data tunnel and traffic from the client device to the local network is forwarded to a local uplink of the AP.

11. An access point (AP) comprising:
    a processor;
    a non-transitory storage medium storing instructions that when executed on the processor cause the AP to:
    set up a data tunnel between the AP and a remote network;

monitor, by the AP, a remote Dynamic Host Configuration Protocol (DHCP) session between a client device coupled to the AP and a remote DHCP server in the remote network, wherein the remote DHCP server assigns a remote Internet protocol (IP) address to the client device, and wherein a communication between the client device and the remote network is based on the remote IP address;

based on determining completion of the remote DHCP session, initialize a local DHCP session with a local DHCP server in a local network on behalf of the client device to obtain a local IP address for the client device, wherein a communication between the client device and the local network is based on the local IP address; and based on detecting the client device roaming from the AP to a target AP, forward, by the AP, the remote and local IP addresses of the client device and session data associated with an active session on the client device to the target AP.

12. The AP of claim 11, wherein the instructions when executed cause the AP to perform source address translation using the local IP address of the client device for the communication between the client device and the local network.

13. The AP of claim 11, wherein the monitoring of the remote DHCP session comprises snooping on DHCP messages exchanged between the remote DHCP server and the client device over the data tunnel, and wherein the instructions when executed cause the AP to:

determine the completion of the remote DHCP session based on a DHCP acknowledgment message detected in the snooping.

14. The AP of claim 11, wherein the the instructions when executed cause the AP to forward DHCP lease information associated with the local IP address of the client device to the target AP.

15. The AP of claim 11, wherein the instructions when executed cause the AP to:

subsequent to obtaining the local IP address for the client device, enable a proxy Address Resolution Protocol (ARP) function for the local IP address of the client device.

16. The AP of claim 15, wherein the instructions when executed cause the AP to:

subsequent to forwarding the remote and local IP addresses of the client device to the target AP, disable the proxy ARP function for the local IP address of the client device.

17. The AP of claim 11, wherein the AP obtains the local IP address on behalf of the client device from the local DHCP server in the local DHCP session,.

18. The AP of claim 11, wherein the instructions when executed cause the AP to store a mapping between the local IP address and a media access control (MAC) address of the client device in a local IP table.

19. A non-transitory machine-readable storage medium comprising instructions that upon execution cause an access point (AP) to:

set up a data tunnel between the AP and a remote network;

monitor, by the AP, a remote Dynamic Host Configuration Protocol (DHCP) session between a client device coupled to the AP and a remote DHCP server in the remote network, wherein the remote DHCP server assigns a remote Internet protocol (IP) address to the client device, and wherein a communication between the client device and the remote network is based on the remote IP address;

based on determining completion of the remote DHCP session, initialize a local DHCP session with a local DHCP server in a local network on behalf of the client device to obtain a local IP address for the client device, wherein a communication between the client device and the local network is based on the local IP address; and based on detecting the client device roaming from the AP to a target AP, forward, by the AP, the remote and local IP addresses of the client device and session data associated with an active session on the client device to the target AP.

20. The non-transitory machine-readable storage medium of claim 19, wherein the AP obtains the local IP address on behalf of the client device from the local DHCP server in the local DHCP session.

* * * * *